United States Patent [19]
Cummings

[11] Patent Number: 6,021,742
[45] Date of Patent: Feb. 8, 2000

[54] LIVESTOCK WORKING ALLEY

[76] Inventor: William D. Cummings, P.O. Box 163514 Regal Crescent, Garden City, Kans. 67846-1635

[21] Appl. No.: 09/065,669

[22] Filed: Apr. 23, 1998

[51] Int. Cl.[7] .................................................. A01K 29/00
[52] U.S. Cl. .......................... 119/843; 119/502; 119/522; 119/752
[58] Field of Search .................................... 119/502, 522, 119/752, 732, 840, 843

[56] References Cited

U.S. PATENT DOCUMENTS

| | | | |
|---|---|---|---|
| 3,194,213 | 7/1965 | Soukup | 119/752 |
| 3,370,835 | 2/1968 | Crowson | 119/752 X |
| 4,535,723 | 8/1985 | Gealy | 119/502 |
| 4,898,121 | 2/1990 | Reynolds | 119/752 |

FOREIGN PATENT DOCUMENTS 2212702  8/1989  United Kingdom ................... 119/502

*Primary Examiner*—Michael J. Carone
*Assistant Examiner*—James S. Bergin
*Attorney, Agent, or Firm*—Edward L. Brown, Jr.

[57] ABSTRACT

An adjustable width livestock working alley for handling various size animals including a stationary support frame supporting a first arcuate-shaped stationary outer wall and a second arcuate-shaped moveable inner wall including multiple sections, pivotally joined together at the ends of the sections so that the effective radius of the overall inner wall can be changed. A series of connecting links, connecting the support frame to the multiple arcuate sections at their pivot joints with each connecting link starting with the first link having the shortest length with the links of each additional section being proportional to the accumulated changes in the circumferential length of the wall sections as the effective radius of the inner wall is changed and power means connected to the multiple sections for moving those sections radially and longitudinally to change the effective radius of the inner wall.

4 Claims, 4 Drawing Sheets

LIVESTOCK WORKING ALLEY

FIELD OF THE INVENTION

The present invention relates to livestock working alleys and more particularly to an automatic adjustable width curved alley for handling various sized animals.

BACKGROUND OF THE INVENTION

In livestock operations, it is often necessary to restrain the animals for palpating, immunization, branding, examination and weighing. Corrals, loading chutes, alley ways and pens have heretofore been constructed and used by cow/calf operators, steer operators and large animals veterinarians of these purposes.

The concept of providing a variable width livestock working chutes to handle calves as well as full-sized animals had generally been known for the better part of this century, as typified in the U.S. Pat. No. 3,370,835 to Crowson. In this patent, like other working alleys that are on the market, the requirements to adjust the movable wall of the chute require manual adjustments along the complete length of the chute which can be very time consuming.

SUMMARY OF THE INVENTION

The livestock working alley of the present invention is arcuate in length, however, the means of adjustment of the movable inner wall is considered unique in its movement and manner of adjustment. The actuation of a single lineal hydraulic cylinder causes the entire segmented inner wall of the alley to move radially and longitudinally so as to change its effective radius and thereby change the effective width of the alley to accommodate the stock being handled.

It is the principal object of the present invention to provide an adjustable width livestock working alley which can be changed in width in a manner of seconds.

Another object of the present invention is to provide an adjustable width cattle working alley which is simple in design and rugged in construction.

A more complete understanding of the invention may be obtained from the following detailed description forming a specific embodiments thereof, when read in conjunction with the appended drawings.

BRIEF DESCRIPTION OF THE DRAWINGS

FIG. 5. Is a side elevational view, to an enlarged scale, of the first link pivotally connected to the first section of the movable wall in its wide FIG. 4 position.

FIG. 6. Is a similar side elevational view to FIG. 5 with the first link in its FIG. 3 position.

DETAILED DESCRIPTION OF THE PREFERRED EMBODIMENT

Figure 1:
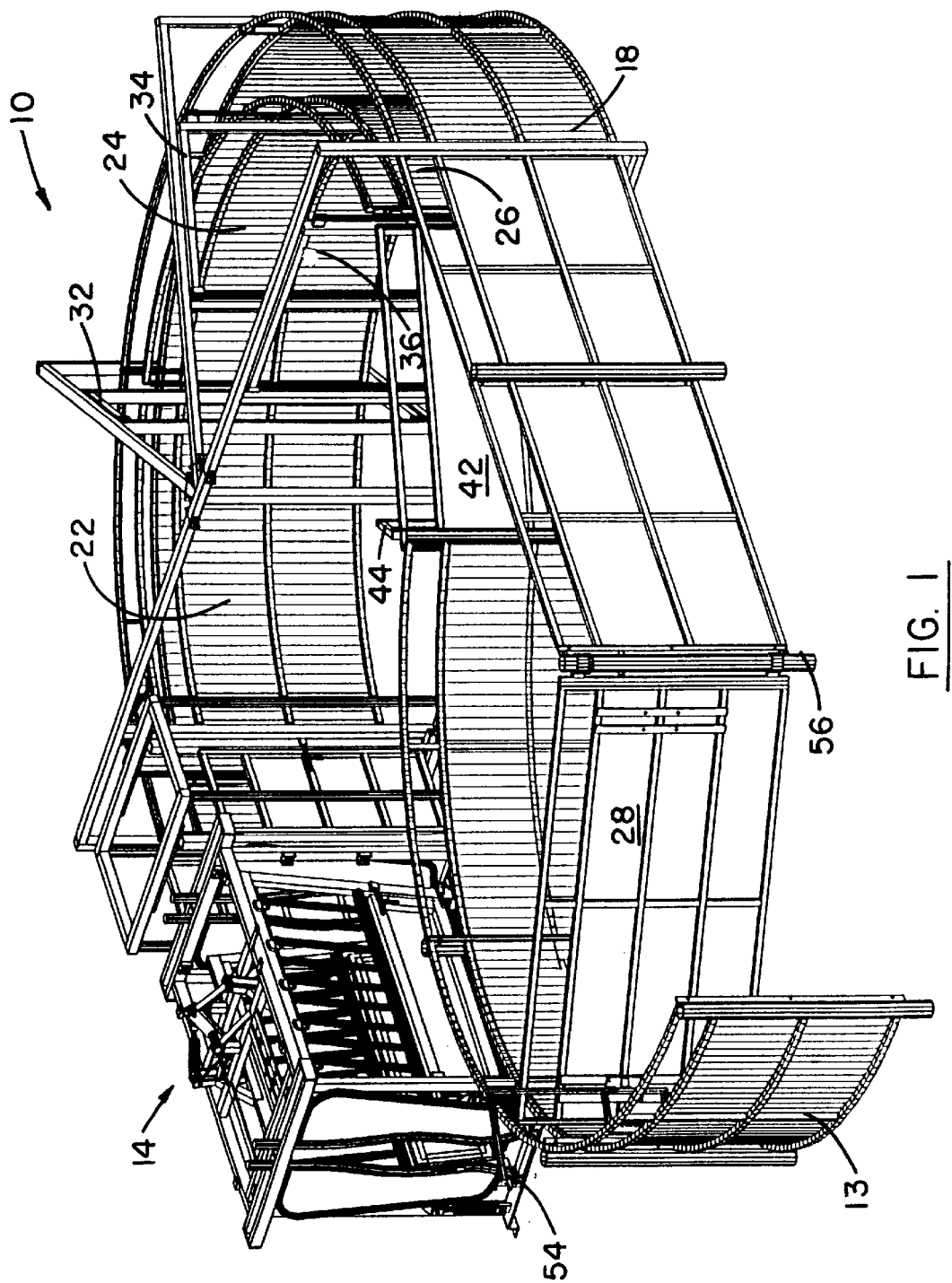
FIG. 1. is a perspective view of the livestock working alley connecting a crowding pen to a squeeze chute with the working alley in its narrow position.
Figure 2:
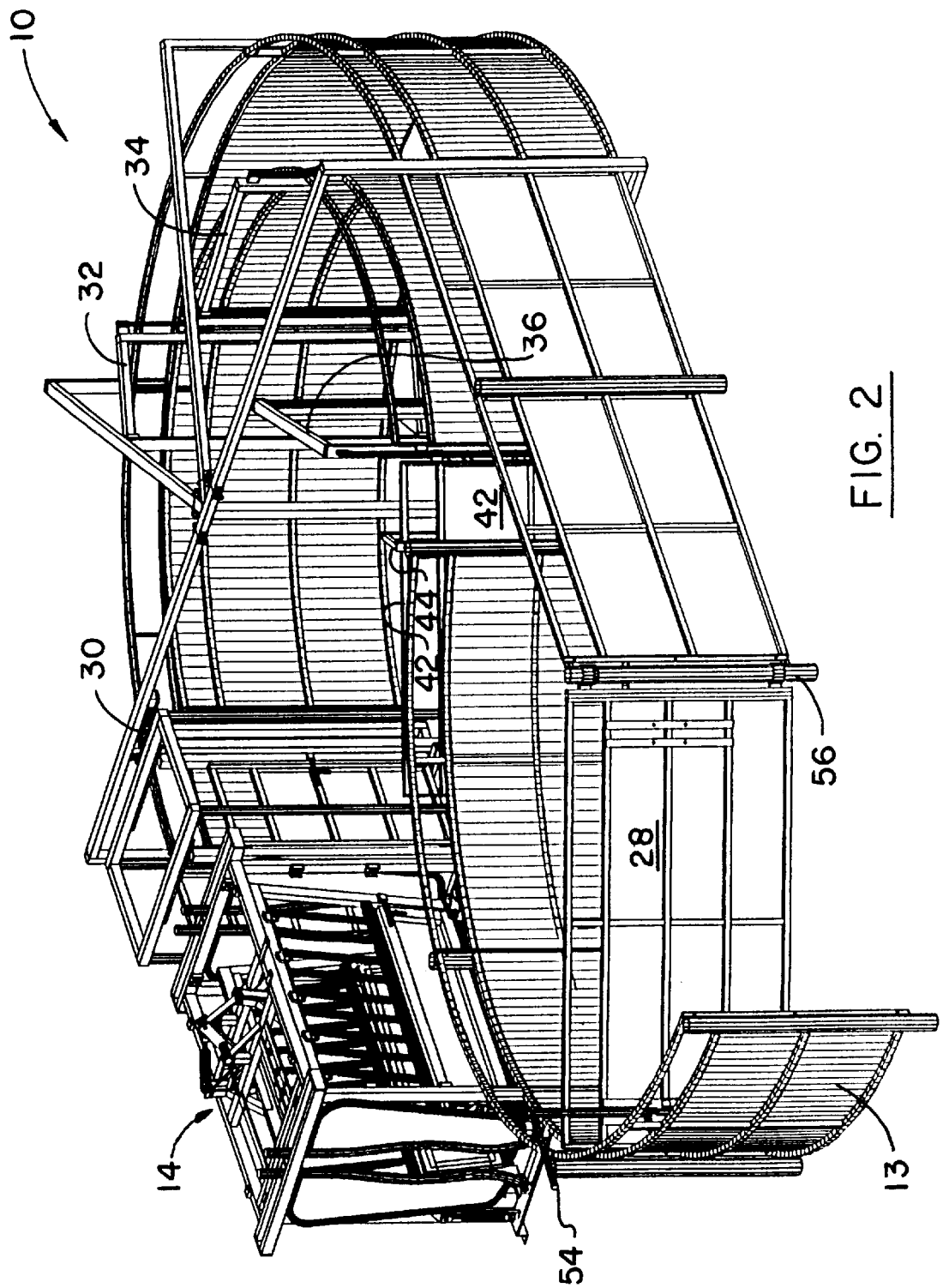
FIG. 2. Is a similar perspective view to FIG. 1 with the work alley in its wide position.

The adjustable width livestock working alley is generally described by the reference numeral 10 and it comprises a conventional crowding pen 12 connected to a squeeze chute 14 by way of an adjustable width curved or arcuate alley 16. The crowding pen 12, also referred to as a working tub functions to hold a plurality of animals which are to be individually examined or treated in squeeze chute 14. Rotary gate 28 pivotally mounted on post 56 is used to crowd the animals through the alley in a conventional manner with locking bar 54 preventing the animals from opening the gate.

It is always necessary to have the width of the alley sufficiently narrow so the animals cannot turn around within the alley but rather are forced to continue forward toward the squeeze chute 14 which restricts the individual animals fore and aft as well as side movement. While not shown in the drawing, typical working alleys have some type of one-way gate structure preventing the animals, once they are through, from backing up into the crowding pen. The arcuate-shaped adjustable alley 16 includes a fixed outer wall 18 and a movable inner wall 20. The inner wall 20 comprises at least three sections 22, 24 and 26 which are joined together by pivoting joints 52 which allows the sections to rotate about a vertical axis.

Figure 4:
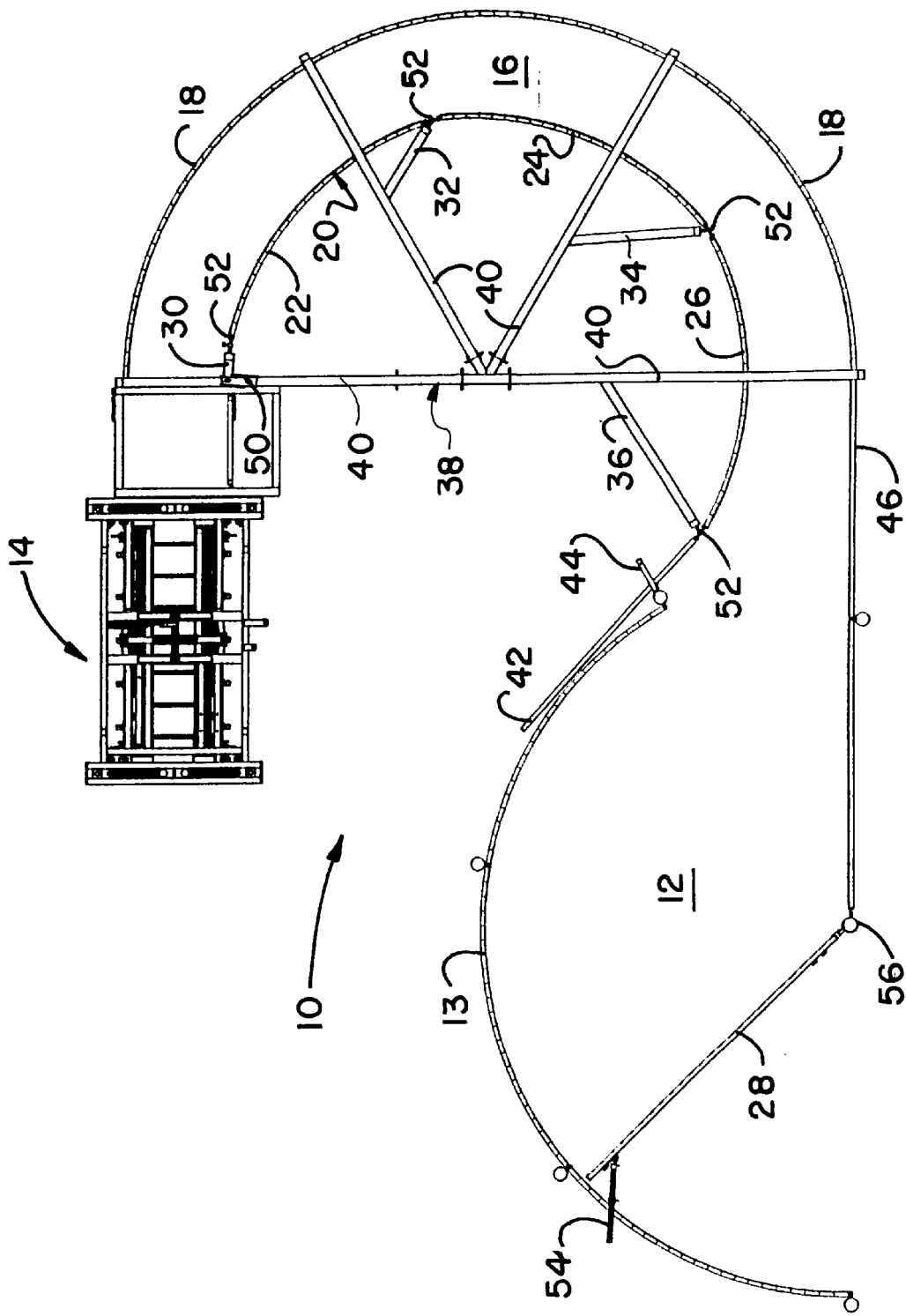
FIG. 4. Is a top plan view of the working alley in its wide FIG. 2 position.

For supporting the inner and outer walls of the alley, a fixed frame structure 38 is provided which limits the movement of the movable wall sections 22, 24 and 26. The movable wall sections are connected to the frame structure 38 through a series of links 30, 32, 34 and 36, as best seen in FIG. 4, each of which is connected to one end of each wall sections 22 and 24 while links 34 and 36 are connected to opposite ends of wall section 26. Each link is pivotally connected to a series of radial fixed arms 40 which make up the fixed frame 38. Each link is pivotally connected at its opposite end to the various wall sections at pivotal joints 52. Pivotally connected to the end of the last wall section 26 is a straight wall section 42 which slides through a receiving slot 44 which is fixed at the end of fixed arcuate wall 13 which defines the crowding pen 12. The straight section 42 is in overlapping relationship with fixed wall 13 and permits the extra wall length in the wide position to be taken up by extended overlap as best seen in FIG. 4.

Figure 3:
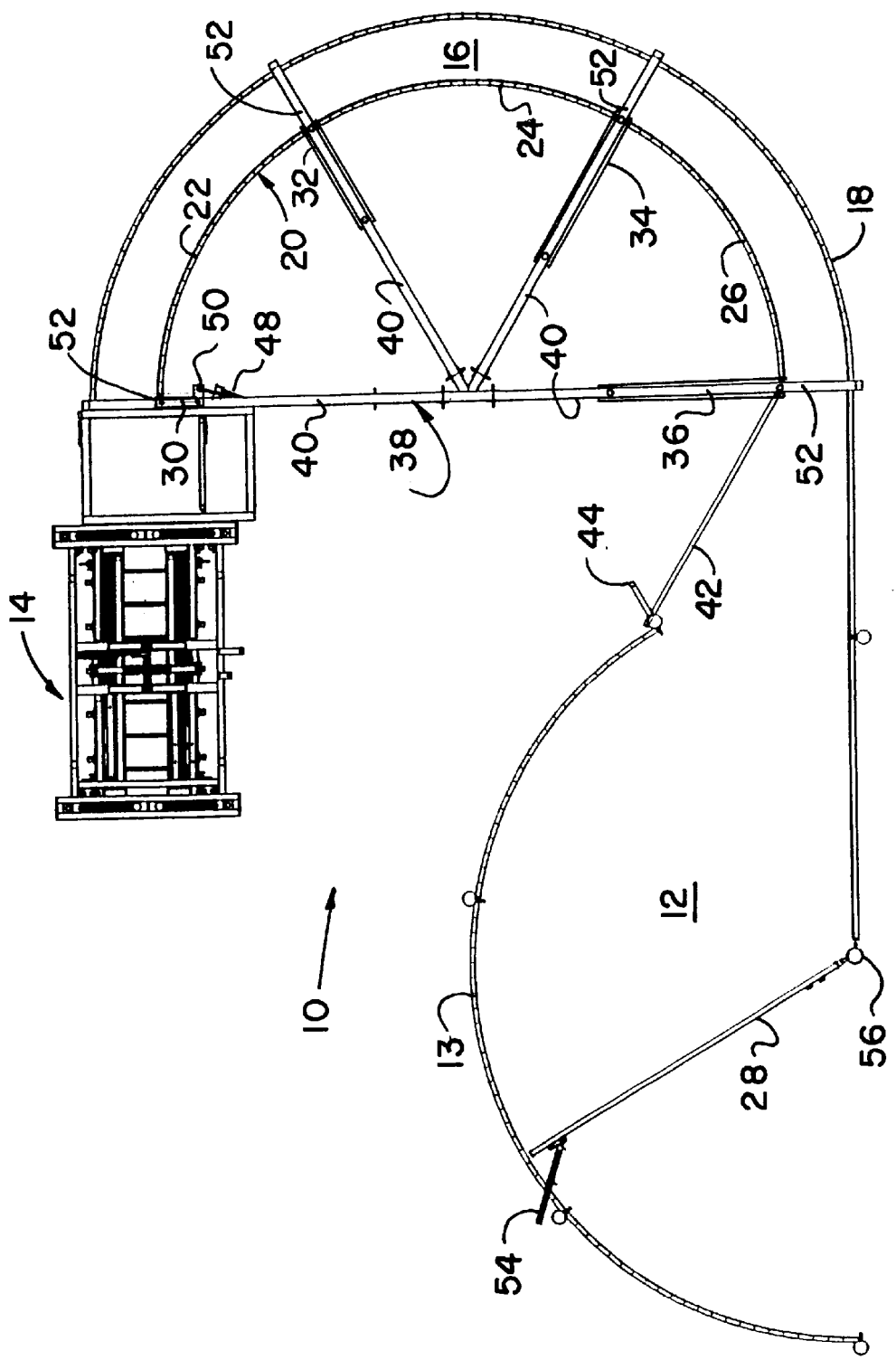
FIG. 3. Is a top plan view of the working alley in its narrow FIG. 1 position.

When alley 16 is positioned in its narrow configuration as seen in FIG. 3, the various links 30, 32, 34 and 36 are all shown lying parallel and under the fixed radial arms 40 of the frame. As the movable wall 20 begins to widen from its FIG. 3 narrow position, the various connecting links rotate in a clockwise direction through various angles as seen in the FIG. 4 position.

The movement of the inner wall sections is caused by the retraction of the hydraulic cylinder 48 from its FIG. 3 position. Cylinder 48 is pivotally connected to an offset leg 50 which in turn is rigidly connected to link 30. Retraction of cylinder 48 causes link 30 to move clockwise as seen in FIG. 3 through 90° to its FIG. 4 position. This forced rotation of link 30 causes links 32, 34 and 36 to rotate in a clockwise direction causing the wall sections 22 and 24 to not only slide in a clockwise direction but also move radially inward to their FIG. 4 position. The connecting links 30, 32, 34 and 36 vary in length since they each accommodate the accumulated added or subtracted circumference as the effective radius of the inner wall 20 changes. The fixed radius of the movable sections 22, 24 and 26 would ideally be somewhere between the maximum and minimum effective radius shown in FIG. 3 and 4. When the alley moves to its wide position as seen in FIG. 4 the reduced circumference of the inner wall 20 is accommodated by the sliding overlap of straight wall section 42 through receiving slot 44.

FIGS. 5 and 6 illustrate the two positions of link 30 as also seen in FIGS. 4 and 3 respectively. In the wide position of FIG. 4 link 30 is shown parallel to wall section 22 which is also shown in FIG. 5. The narrow position of FIG. 3, link 30 is shown positioned 90° from wall section 22 as also seen in FIG. 6.

It is to be understood that while certain forms of the present invention have been illustrated and described herein, it is not to be limited to the specific forms or arrangement of parts described or shown.

What is claimed or desired to be secured by Letter Patent is as follows:

1. An adjustable width livestock working alley for handling various size animals comprising:

a stationary support frame;

a first arcuate-shaped stationary outer wall supported by said frame structure;

a second arcuate-shaped moveable inner wall including multiple sections, pivotable joints at the ends of said sections connecting each section to the adjacent section so the effective radius of the overall inner wall can be changed;

a series of connecting links, each link pivotally connected at one end to the stationary frame and at the opposite end to one of said pivotable joints, each connecting link starting with a first link having a first length, with the lengths of each additional link being proportional to the accumulated changes in circumferential length of the wall sections contained in the support frame as the effective radius of the inner wall is changed;

power means connected to said multiple sections for movement of said sections radially and longitudinally to change the effective radius of said inner wall.

2. An adjustable width livestock working alley as set forth in claim 1 including a crowding pen with a fixed wall connected to the entry end of the alley, a receiving slot at the end of the fixed wall for reception and guiding of the last inner wall section in overlapping relation with the fixed wall of the crowding pen.

3. An adjustable width livestock working alley as set forth in claim 1 including a crowding pen with a fixed wall connected to the entry end of the alley, a receiving slot at the end of the fixed wall, a straight wall section pivotally connected to the last arcuate inner wall section slidably extending through the receiving slot in overlapping relation with the fixed wall of the crowding pen.

4. An adjustable width livestock working alley as set forth in claim 1 wherein the power means is a hydraulic cylinder connected to the first link for rotating the first link.

* * * * *